Nov. 4, 1969     R. PETTY     3,476,671
ELECTRODE ASSEMBLY INCLUDING AN ELASTOMERIC CAP
Filed May 16, 1966
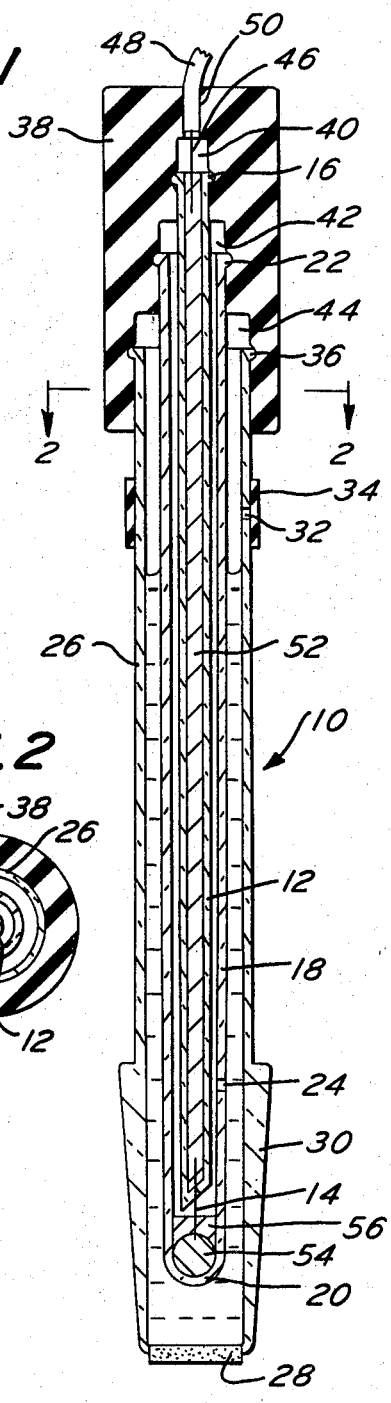
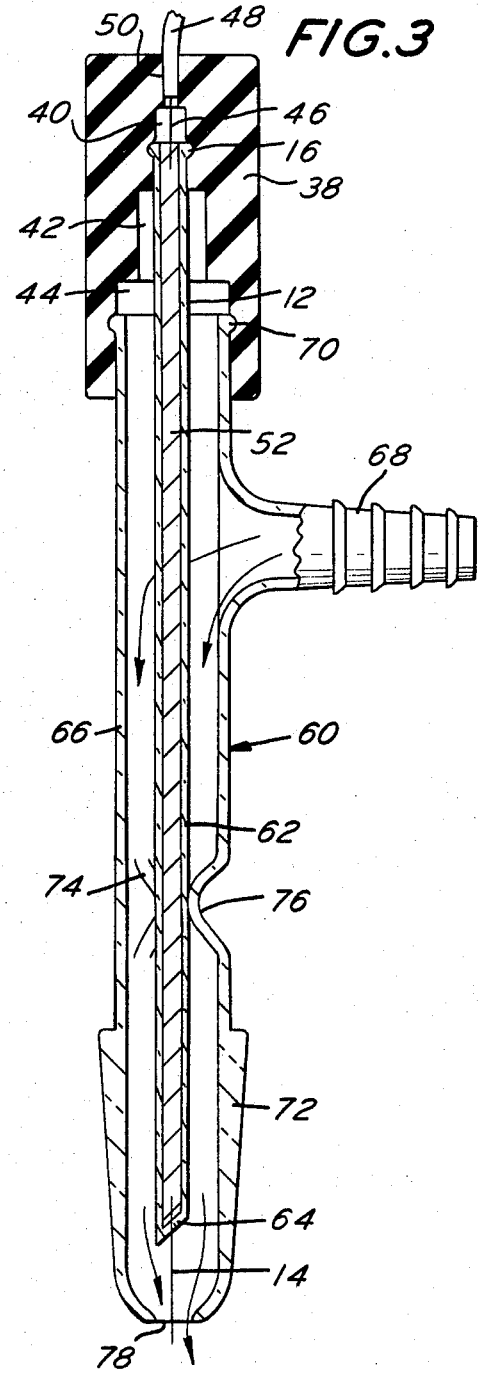
INVENTOR.
RICHARD PETTY
BY Seidel & Gonda
ATTORNEYS.

United States Patent Office 3,476,671
Patented Nov. 4, 1969

3,476,671
ELECTRODE ASSEMBLY INCLUDING AN ELASTOMERIC CAP
Richard Petty, Vineland, N.J., assignor to Kontes Glass Company, Vineland, N.J., a corporation of New Jersey
Filed May 16, 1966, Ser. No. 550,533
Int. Cl. B01k 3/04
U.S. Cl. 204—195                        7 Claims

ABSTRACT OF THE DISCLOSURE

A resilient electrode cap having stepped cylindrically shaped bores therein capable of holding and adjustably positioning a plurality of electrode assemblies therein.

This invention relates to an electrode cap. More particularly, this invention relates to a universal electrode cap that will permit relative adjustment between electrode elements during or after assembly.

Electrodes such as calomel, hydrogen, platinum oxidation-reduction, base metal, platinum and many others are known tools of chemical analysis. Ordinarily the electrodes are multi-component devices comprising concentric cylindrical tubes with having one end supported in communication with an electrode vessel and the other end connected to a source of electrical energy. Heretofore these multi-component tube devices have been interconnected in various ways such as soldering, screw thread caps, low melting waxes and plastics. The disadvantage of such prior art devices is that they allow only a fixed seal and position of the components. In many instances it is desirable to re-adjust and position the components after assembly.

It therefore is a general object of the present invention to provide a device for interconnecting and sealing the ends of concentric tubes while also providing for relative component movement.

Another object of the present invention is to provide a novel and unobvious closure for concentric tubes.

Still another object of the present invention is to provide a novel and unobvious device for adjustably retaining the ends of the multi-component tubular apparatus.

Still another object of the present invention is to provide a novel and unobvious cap for sealing and adjustably retaining the components of an electrode assembly.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a sectional view of a calomel electrode assembly sealed by the cap of the present invention.

FIGURE 2 is a transverse sectional view of the electrode assembly illustrated in FIGURE 1 taken along the line 2—2.

FIGURE 3 is a sectional view of a hydrogen electrode assembly sealed by the cap of the present invention.

Referring now to the drawing in detail, there is shown in FIGURE 1 a calomel electrode assembly designated generally as 10. Although the present invention is described in connection with an electrode assembly, those skilled in the art will readily recognize that it has application to other apparatus used in scientific laboratory techniques. In addition to electrodes, the novel and unobvious cap of the present invention can be used with immersion tubes, gas flow and discharge assemblies and other concentric tubular devices in common usage for illumination, radiation and heating and cooling jackets around tubes containing liquid or gas either stationary or flowing.

The electrode assembly 10 illustrated in FIGURE 1 comprises a complete calomel half cell electrode assembled and ready for use. The assembly 10 comprises an inner tubular member which has a short length of platinum wire extending through the sealed lower end thereof. Preferably, the tubular member 12 is made of glass and has an open upper end with a flange 16 extending about the periphery thereof. The tubular member 12 and platinum wire 14 in combination are known as a platinum electrode.

A second tubular member 18 surrounds the member 12 and is concentric therewith. The tubular member 18 is sealed at its lower end 20 and open at its upper end as shown. A flange 22 extends laterally from the periphery of the open end of member 18. An opening 24 is provided in the side wall of tubular member 18. Although the distance between the lower end 20 and the hole 24 is not critical, in the preferred embodiment such distance is approximately 25 mm.

The electrode assembly 10 is completed by an outer tubular body 26 which is sealed at its lower end by a fritted disc 28. The lower portion 30 of body 26 is tapered as shown and ground on its outer surface to define a standard taper 14/20 joint by which the entire electrode assembly 10 may be supported. Those skilled in the art will readily recognize that other types of joints or support means may be used for the electrode assembly 10. A hole 32 is provided adjacent the upper end of body 26 through which potassium chloride or another type of solution to act as a salt bridge can be added or withdrawn. The hole 32 is sealed by an elastic band 34 which extends about the outer body 26. The band 34 can be slid along the body 26 so as to either cover or expose the hole 32. Body 26 is open at its upper end and a laterally extending flange 36 extends about the periphery thereof.

Inner tubular member 12, second tubular member 18 and outer body 26 are held in assembled concentric relationship by an end cap 38. The cap 38 comprises a cylindrical member having a plurality of concentric, axially aligned, stepped bores 40, 42 and 44 which receive the tubular members 12, 18 and the body 26 respectively. The inner diameter of each bore is approximately equal to the outer diameter of the body which it receives. Thus, as shown the flange about the periphery of each member will deform the side wall of each bore and thereby frictionally retain the member therein. Each bore 40, 42 and 44 is elongated thereby permitting the tubular members 12, 18 and 26 to be adjustably positioned therein.

The cap 38 is made from an elastomeric material such as rubber, silicone rubber or similar materials with comparable elastic and high friction coefficient properties suitable to fit variable tube diameters. The material may also be polymer such as those derived from the polyethylene and Tygon families. The material should be chosen to permit movement for component positioning and still have a sufficiently high coefficient of friction to retain the elements in their selected positions. Moreover, the material must maintain a hermetic seal between each component and the atmosphere as well as a seal between the respective components. In the preferred embodiment, the cap 38 is made of a silicone rubber.

The calomel half cell is shown in its assembled condition in FIGURES 1 and 2. A length of stranded copper wire or other electrically conducting material 46, covered by an insulating material 48, has been stripped adjacent its end and projected through an opening 50 in the top wall of cap 48. The insulation 48 is frictionally engaged in the opening 50 and thereby seals the same.

The tubular member 12 has been inserted into the bore 40 so that the wire 46 projects at least partially into the open end thereof. The electrical connection between the lead wire 46 and the platinum electrode 14 is made by melting a granular alloy having a low melting point inside the tube 12 and introducing the wire 46 into the melted alloy 52. The alloy is then permitted to solidify and thereby provides an electrical interconnection between the wire 46 and electrode 14. By way of example, the alloy may be Wood's low melting alloy, comprising a mixture of tin, bismuth, lead, and cadmium so proportioned as to melt around 70° C. This temperature is low enough so that the alloy can be melted in glass, such as by inserting tube 12 into a solution of boiling water, and used to make a semi-permanent conducting metal joint between the copper lead wire 46 and platinum electrode 12. A globule of reagent grade mercury 54 is placed in the bottom of the tubular member 18 to a height of approximately 5 mm. A calomel paste comprising mercury, mercurous chloride and a dampening agent such as potassium chloride is inserted through the opening 24 to a height of approximately 8–10 mm. The platinum electrode 14 extends through the calomel paste 56 and into the globule of mercury 54. The tube 18 is supported in the intermediate bore 42 by frictional engagement between its flange 22 and the side of the bore. The outer tubular member 26 surrounds the tube 18 and contains a solution of potassium chloride to a height above the hole 24. Additional potassium chloride, if needed, can be inserted through the opening 32. As thus assembled, the electrode 10 is ready for use in the conventional manner.

It should be apparent that the inner spacing between the ends of the electrode tubular members can be adjusted by sliding them along the bores 40, 42 and 44. Normally the spacing between the end of tube 12 and the bottom 20 of tube 18 is predetermined and left unchanged during the electrode operation. However, it is clear that such predetermined positioning can be accurately arrived at during the assembly of the electrode 10. The distance between the fritted disc 28 and the field lower end of the tube 18 often must be adjusted. This is readily accomplished by sliding the flange 36 along the bore 44. This adjustment can be accomplished without disturbing the distance between the platinum wire and the end 20 of tube 18.

Referring now to FIGURE 3, there is shown a hydrogen electrode designated generally as 60. The hydrogen electrode is assembled and retained in position by the cap 38 described above. In this manner the universal application of the cap is illustrated.

The hydrogen electrode 60 comprises an inner tubular member 62 which is sealed at its end 64. A platinum wire extends through the end 64 as shown. If desired, the wire 14 may be made longer for use in a hydrogen electrode.

In the manner described above, electrical connection between the wire 14 and the lead wire 46 made by melting an electrically conducting alloy 52 within the tube 12. The lead wire 46 is protected by an insulating material 48 and extends through the opening 50 and cap 38.

The cap 38 includes concentric axially aligned bores 40, 42 and 44 of successively increased diameters. As with the electrode 10, cap 38 is made from an elastomeric material with elastic and high coefficient properties, such as silicone rubber.

The hydrogen electrode 60 includes an outer shell 66 which is open at both its upper and lower end and provided with a hose connector 68. An annular flange 70 extends laterally and around the periphery of the upper end of shell 66. The flange 70 engages the cap 38 within the bore 44 and is frictionally held in position therein. The portion 72 adjacent the lower end of shell 66 is ground to a standard taper so that the electrode 60 can be assembled in gas tight relation with a vessel. The side wall of shell 66 is indented at three points, two of which are 74 and 76 as shown, to engage the side wall of tube 66 and thereby prevent lateral displacement of the same.

In operation, the hydrogen gas is introduced into the electrode 60 through a hose connected to the arm 68 and allowed to pass downwardly through the open end 78 into the reaction vessel.

From the foregoing, it should be readily apparent the cap 38 has been used to retain and seal a hydrogen electrode which is of substantially different construction than the calomel electrode illustrated in FIGURE 1. Thus, the middle bore 42 is not used but the proper relationship between the shell 66 and the position of the platinum wire 14 can still be maintained.

I claim:

1. In an electrode assembly comprising an outer tubular member, at least one inner tubular member concentrically disposed with respect thereto and an electrode disposed within said inner tubular member, means for supporting said tubular members and said electrode for relative longitudinal adjustment comprising a cap of integrally constructed elastomeric material, said cap having at least first and second axially aligned stepped cylindrically shaped bores therein, said bores having respective inner dimensions approximating the outer dimensions of said outer and inner members, said bores frictionally engaging and retaining said members in selected relative longitudinal positions, and an axially aligned opening in said cap in communication with one of said bores adapted to secure an electrode lead, whereby said tubular members and electrode are retained in selected relative longitudinal positions.

2. In an electrode assembly in accordance with claim 1, said cap including first, second and third axially stepped bores so that said bores are adapted to retain an outer tubular member and up to two inner tubular members.

3. In an electrode assembly in accordance with claim 1, said cap being made of silicone rubber.

4. In an electrode assembly in accordance with claim 1 wherein said outer tubular member is provided with an opening, an elastic band extending around said tubular member and adapted to be positioned over said opening.

5. An electrode cap comprising an outer elastomeric portion of integral construction having a hollowed-out inner portion, said hollowed-out inner portion comprising a first cylindrical portion having a first radius, a second cylindrical portion having a second radius, a third cylindrical portion having a third radius, a fourth cylindrical portion having a fourth radius, said first, second, third and fourth cylindrical portions being concentrically disposed, said first radius being greater than said second radius, said second radius being greater than said third radius, said third radius being greater than said fourth radius, said first cylindrical portion extending from one end of said cap and terminating short of the other end of said cap, said second cylindrical portion lying entirely within said cap and beginning at an end of said first cylindrical portion, said third cylindrical portion lying entirely within said cap and beginning at an end of said second second cylindrical portion, and said fourth cylindrical portion beginning at an end of said third cylindrical portion and terminating at said other side of said cap.

6. A cap in accordance with claim 5, said cap being made of silicone rubber.

7. In an assembly of tubular members comprising an outer tubular member, an inner tubular member concentrically disposed with respect thereto and an interior tubular member disposed within said inner tubular member, means for supporting said outer tubular member, said inner tubular member, and said interior tubular member for relative longitudinal adjustment comprising a cap of integrally formed elastomeric material, said cap having first, second and third axially aligned stepped cylindrically shaped bores, said bores having respective inner dimensions approximating the outer dimensions of said outer, inner and interior tubular members, said bores frictionally engaging and retaining said outer, inner and interior tubular members in selective relative longitudinal positions, whereby said outer, inner and interior tubular members are retained in selected relative longitudinal positions.

References Cited

UNITED STATES PATENTS

| | | | |
|---|---|---|---|
| 2,603,218 | 7/1952 | Rane | 215—38 |
| 2,910,420 | 10/1959 | Preiser | 204—196 |
| 2,930,063 | 3/1960 | Stull | 215—47 |
| 3,167,202 | 1/1965 | Tolciss | 215—47 |
| 3,215,613 | 11/1965 | Lainson | 204—286 |
| 3,234,117 | 2/1966 | Rost et al. | 204—195 |
| 3,361,660 | 1/1968 | Chittum et al. | 204—195 |

JOHN H. MACK, Primary Examiner

T. TUNG, Assistant Examiner

U.S. Cl. X.R.

204—279, 286, 297; 215—38, 47